Sept. 28, 1937.  A. FORICHON  2,094,449

CHANGE SPEED MECHANISM

Filed Jan. 12, 1933  4 Sheets-Sheet 1

Fig.1

Alphonse Forichon
Inventor
by Barnett and Barnett
Attorneys

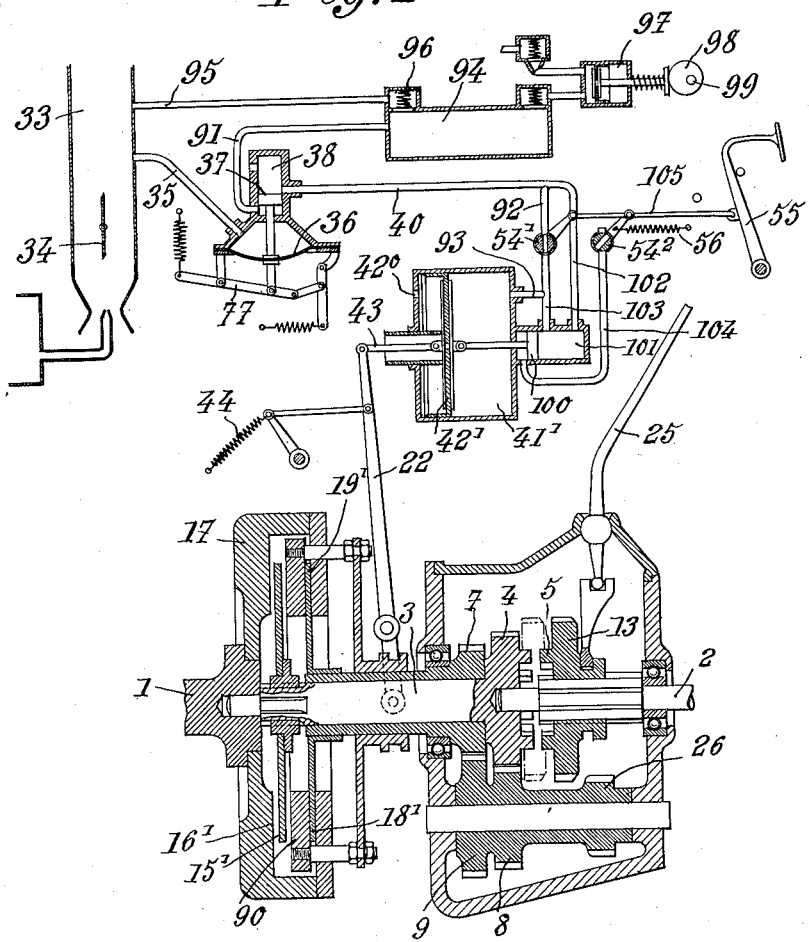
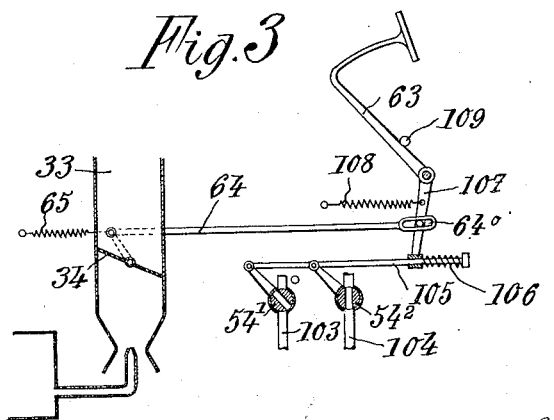

Sept. 28, 1937.  A. FORICHON  2,094,449
CHANGE SPEED MECHANISM
Filed Jan. 12, 1933  4 Sheets-Sheet 3

Alphonse Forichon
Inventor
by Barnett and Barnett
Attorneys

Sept. 28, 1937.   A. FORICHON   2,094,449
CHANGE SPEED MECHANISM
Filed Jan. 12, 1933   4 Sheets-Sheet 4

Fig.5.

Alphonse Forichon, Inventor
by Barnett and Barnett, Attorneys

Patented Sept. 28, 1937

2,094,449

UNITED STATES PATENT OFFICE 2,094,449

CHANGE SPEED MECHANISM

Alphonse Forichon, Paris, France

Application January 12, 1933, Serial No. 651,331
In Belgium January 18, 1932

13 Claims. (Cl. 192—.01)

My invention relates to variable speed transmission gears, and especially to those for automobile vehicles, and to devices for controlling said gears.

The object of my invention is to provide mechanisms of that type that are simple, easy to operate, and capable of giving more progressive gear changings, at least for some of the gear combinations.

Another object of my invention is to provide mechanisms of that type that can be controlled either automatically or not.

To this effect, according to my invention, I provide the coupling of the main shafts (driving shaft and driven shaft) by means of two pairs of gear wheels through two concentric shafts and two clutches.

Another feature of my invention consists in the use of means actuated by fluids (electricity, rarefied or compressed fluid) for operating the clutches corresponding to the various gear combinations, and of means for ensuring the automatic distribution of said fluids in accordance with the load of the engine and the speed of the driving shaft or of the driven shaft.

Preferred embodiments of my invention will be hereinafter described with reference to the accompanying drawings, given merely by way of example, and in which:

Fig. 1 is a diagrammatic vertical sectional view of a variable speed transmission according to a first embodiment of my invention;

Fig. 2 is a similar view corresponding to a second embodiment;

Figs. 3 and 4 are detail views showing modifications of the embodiment of Fig. 2;

Fig. 5 is a diagrammatic vertical sectional view of a variable speed transmission device according to a third embodiment of my invention;

Figure 4:
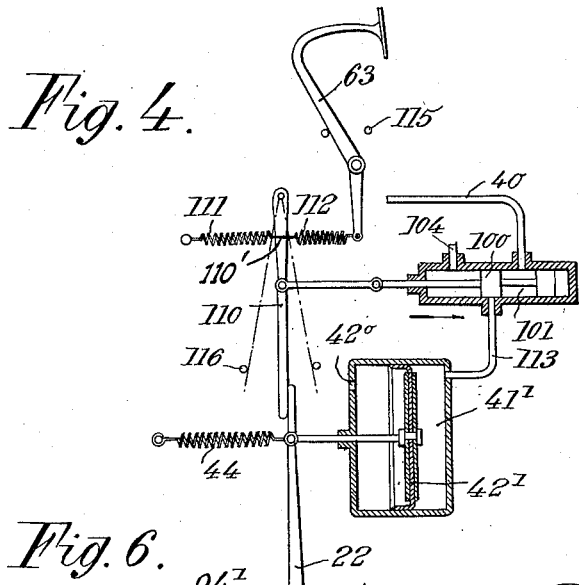

Fig. 1 shows a four speed gear-box in which the passing from first gear to second gear and conversely and also the passing from third gear to fourth gear and conversely are automatically controlled by the variations in the working conditions of the engine, this result being obtained through the action of a controlling or regulating device of the type described in my U. S. Patent No. 1,839,145. On the contrary, the passing from second to third gear is obtained by operating a hand lever. In this gear box unclutching is effected through a pedal or a similar organ in the usual manner.

Between driving shaft 1 and driven shaft 2 there is provided an intermediate shaft 3, which carries a toothed wheel 4 that is in constant mesh with a wheel 8 carried by a sleeve 10 adapted to revolve freely about an auxiliary shaft or layshaft 11 journalled in casing 12. Intermediate shaft 3 also drives, through a feather key, a clutch disk 15 provided with a return spring 20, said disk cooperating with a friction surface 16 provided in fly-wheel 17 keyed on driving shaft 1. Toothed wheels 4 and 8 form a first pair of gears.

On intermediate shaft 3 there is mounted loose a concentric hollow shaft 6 carrying a toothed wheel 7 which is in constant mesh with a toothed wheel 9 integral with said sleeve 10. A clutch disk 18 adapted to cooperate with a friction surface 19 provided in fly-wheel 17 is keyed, through a feather key, on said hollow shaft 6. Toothed wheels 7 and 9 form the second pair of gears.

Driven shaft 2 can be coupled with either intermediate shaft 3 or hollow shaft 6 through a pinion 13 slidably keyed on driven shaft 2 and the longitudinal position of which is controlled through a hand lever 25. Said pinion 13 is provided with dogs 14, which can be engaged between corresponding dogs 5 provided in toothed wheel 4 when the pinion occupies the position shown in dotted lines. In its other operative position, pinion 13 meshes with a gear wheel 26 integral with sleeve 10. When pinion 13 is in its intermediate position (shown in solid lines) the gear box is in neutral.

The first gear is obtained when pinion 13 is in mesh with gear wheel 26 and the clutch 18—19 is let in. The motion of driving shaft 1 is then transmitted to driven shaft 2 through clutch 18—19, hollow shaft 6 and the pairs of gear wheels 7—9 and 26—13.

Second gear is obtained for the same position of pinion 13 but by releasing clutch 18—19 and applying clutch 15—16, the motion being then transmitted through intermediate shaft 3 and the pairs of gear wheels 4—8 and 26—13.

In order to change into third gear, pinion 13 is caused to slide until dogs 5 and 14 are in mesh. Clutch 15—16 is disengaged and clutch 18—19 is let in, the motion being transmitted through hollow shaft 6 and the pairs of gear wheels 7—9 and 8—4.

Fourth gear is obtained, for the same position of pinion 13, by disengaging clutch 18—19 and letting in clutch 15—16, the motion being transmitted through direct drive between shafts 3 and 2.

The clutches are operated by displacing lever 22 supported on a pivot 23, said lever cooperating with spring 20, said displacement being optionally obtained either manually or, as shown in Fig. 1, in an automatic manner in accordance with the working of the engine and under the control of a regulating device 36 responsive to variations in the suction existing in induction pipe or inlet conduit 33 between the throttling organ 34 of the carburetter and the engine. That suction acts, through conduit 35, on a diaphragm 36 urged in the opposite direction by a lever 77 and a spring 45. A second spring 83 acts on lever 77 through the intermediary of a lever 82 and of a rod 81 which is inclined in a downward direction when diaphragm 36 is at the bottom of its stroke or is not sucked in. On the contrary, when diaphragm 36 is at the top of its stroke or is sucked in, rod 81 is inclined in an upward direction. It results from that arrangement that diaphragm 36 is more strongly urged in a downward direction when it is in its lower position than when it is in its upper position. Furthermore, the displacement of diaphragm 36 in an upward direction is produced by a suction that is higher than that which is sufficient for maintaining it in its upper position.

Diaphragm 36 operates a slide valve 37 moving in a cylinder 38 and which connects a conduit 40 with the atmosphere, through hole 39, when diaphragm 36 is in its lower position. On the contrary, when diaphragm 36 is sucked in upwardly by the action of the suction, conduit 40 is connected with conduit 35.

The suction, transmitted through conduits 35 and 40 acts in a chamber 41 provided with an elastic membrane 42. Said membrane is connected, through a connecting rod 43, with operating lever 22, which is directly urged by return spring 44. When the engine is running at a high speed of revolution, the suction sucks in first diaphragm 36 and then membrane 42. The lower end of lever 22 is pushed toward the left hand side of Fig. 1, and drives, against the action of springs 44 and 20, the whole of disks 18 and 16, thus disengaging clutch 18—19 and applying clutch 15—16. This changes either into second gear or into top gear, according to the position occupied by sliding pinion 13.

When, on the contrary, the speed of revolution of the engine is lower, the suction at 33 decreases in consequence, and diaphragm 36 moves to its lower position so that the atmospheric pressure is again established in conduit 40 and chamber 41. Lever 22 is then brought by springs 44 and 20 to the position shown in Fig. 1, for which clutch 15—16 is disengaged, and clutch 18—19 is let in, which changes into either first or third gear, according to the position of sliding gear 13.

In order to disconnect the driving shaft and the driven shaft, pedal 55 is depressed against stop 58 which rotates cock 54. Chamber 41 is therefore separated from conduit 40 and connected with the atmosphere through orifice 59. Clutch disks 18 and 15 are therefore free to move toward the right hand side of Fig. 1 under the action of springs 20 and 44, but they are maintained in the middle of their stroke by lever 22 and rod 61 the length of which is chosen in such manner that both clutches are disengaged when pedal 55 is applied against stop 58.

A slot 62 is provided in the end of rod 61 so as to permit the free displacements of membrane 42 and lever 22 in order to let in one or the other of the clutches when pedal 55 is released and is applied against its stop 57 under the action of return spring 56.

In this gear box, the suction that exists in inlet pipe 33 plays the double part of a regulator acting on diaphragm 36 and of a servo-motor acting on membrane 42. As the suction is very low for some working conditions of the engine, it is necessary to provide a membrane 42 of considerable surface.

It may be advantageous that the suction should act only on regulating diaphragm 36, membrane 42 being subjected to the action of an auxiliary suction container provided with a check valve.

Figs. 2 to 4 show some embodiments of controlling devices of that kind.

The gear box shown in Fig. 2 is analogous to that shown in Fig. 1. The lever 22 that controls the displacements of clutch disks $15^1$—$18^1$ provided with an intermediate plate 90 is driven by a piston $42^1$ which moves in a chamber $41^1$ formed by walls $42^0$ and can be connected with a conduit 40. Said conduit 40 is connected, through a slide valve 37 adapted to move in a cylinder 38 and a conduit 91, with a reservoir 94 in which a suction is produced. To this effect, I connect said reservoir with the engine inlet pipe 33 through a conduit 95 provided with a check valve 96. When the suction thus produced ceases to be sufficient, an exhaust pump 97 is brought into action, the controlling organs 98 and 99 of said pump being automatically started by a suitable and well known device (not shown in the drawings) on which acts, for instance the degree of suction in reservoir 94. The suction, transmitted through conduit 35 acts only on regulating diaphragm 36, which drives slide valve 37 in the manner above described.

In order to release the transmission, through a very slight effort of the driver, the ordinary clutch pedal 55 is caused to act, through a rod 105, on a system of coupled cocks $54^1$ and $54^2$. The first of said cocks is inserted in a tube 92 which can connect depression conduit 40, on the one hand and through passage 93 with a chamber $41^1$, and on the other hand through passage 103 with a box 101 in which a slide valve 100 positively connected with piston $42^1$ can move. Said box is also connected through tube 102 with conduit 40, and with the atmosphere through a tube 104 in which there is provided a cock $54^2$. When the pedal is released (Fig. 2), spring 56 brings cock $54^1$ into a position for which conduit 40 is connected, through 92—93, with chamber $41^1$, and through 102, with the box 101 of slide valve 100. Furthermore cock $54^2$ stops tube 104. The operation of piston $42^1$ is then analogous to that of membrane 42 in the embodiment of Fig. 1 and it brings into play the same combinations of gears as above mentioned, according to the positions of diaphragm 36 and slide valve 37.

In order to break the connection between the driving shaft and the driven shaft, the throttle pedal (not shown) is released and the clutch pedal 55 is depressed. The closing of throttle 34 brings to its maximum the suction existing in conduit 33 and diaphragm 36 is sucked in upwardly, thus connecting conduit 40 with the reservoir 94. Pedal 55 closes cock $54^1$ and opens cock $54^2$. The suction is no longer directly transmitted through 92 and 93 to piston $42^1$, but it acts, through passages 102, 101, 103, and 93, on said piston, which is sucked in toward the right hand side of the figure, driving slide valve 100 together with it. When piston $42^1$ reaches the middle of its stroke, that is to say when it is in a position for which both clutches 15¹—16¹ and 18¹—19¹ are disengaged, it stops because slide valve 100 now stops the opening of conduit 103, which interrupts the action of the suction.

If, under the action of inertia or the action of the suction that still exists in chamber 41¹, piston 42¹ kept moving toward the right hand side of the figure, the chamber would be placed into communication with the atmosphere through passages 93, 103, 101, and 104 and piston 42¹ would be brought back toward the left hand side of the figure by spring 44. Said piston therefore occupies a position of equilibrium for which the action of the suction balances the action of spring 44, said position being very near to the middle of the stroke of said piston. For this position of piston 42¹, the intermediate plate 90 of the clutches is also at the middle point of its stroke and both clutches are disengaged. When pedal 55 is released, both cocks 54¹ and 54² are brought back to their initial positions and normal operation again takes place.

In Fig. 3 I have shown a variation of this arrangement for which it is no longer necessary to have recourse to a special pedal (such as 55) for operating cocks 54¹ and 54². In this case the operation of the device is controlled through the throttle pedal 63 (provided with its return spring 65) when said pedal is close to its position that closes throttle valve 34. When pedal 63 is released, that is to say brought into contact with stop 109 by its spring 108, cock 54¹ is closed and cock 54² is open, which, as above explained, corresponds to full unclutching of the device. When pedal 63 is depressed, cock 54¹ is opened and cock 54² is closed during the first part of the displacement of the pedal, without throttle 34 being moved, owing to a slot 64⁰ provided in the control rod 64 of said throttle. I thus bring into play the change speed gear as above explained and pedal 63 can control the position of throttle 34 in the usual way without modifying the position of cocks 54¹ and 54², owing to the interposition of a spring 106 between an arm 107, integral with pedal 63, and the rod 105 that controls the cocks.

In Fig. 4 I have shown another embodiment of the arrangement according to Fig. 2, according to which full unclutching, obtained when piston 42¹ is in the middle of its stroke, is also ensured through throttle pedal 63, as in the case of Fig. 3. However, instead of connecting slide valve 100 directly to piston 42¹, there is provided between them a temporary connection. When throttle pedal 63 is depressed, a spring 112 pulls, toward the right hand side of Fig. 4, a lever 110 pivotally supported at its upper end against the action of a spring 111 that is weaker, both of said springs being attached to said lever. Springs 111 and 112 are connected to lever 110 at point 110¹. Said lever is freely applied against operating lever 22 and therefore moves together with it. Slide valve 100 is connected with lever 110, and therefore follows the displacements of piston 42¹. Said slide valve 100 automatically stops the action of the suction, transmitted through conduits 40 and 113 when it occupies the mean position that corresponds to unclutching. On the contrary, when pedal 63 is released, spring 112 is no longer stretched and spring 111 brings lever 110 back against stop 116, whatever the position occupied by lever 22 and piston 42¹ may be. At that time slide valve 100 occupies a position for which a communication is freely established between conduit 40 and chamber 41¹ so that piston 42¹ can move under the action of regulating diaphragm 36 (Fig. 2) and cause the working of one or the other of clutches 18¹—19¹ and 15¹—16¹.

Fig. 5 shows another embodiment in which the combination of two clutches is replaced by one clutch, for instance of the electro-magnetic type, and a free-wheel. Said arrangement does not allow full unclutching, the free wheel acting imperatively as soon as the clutch device proper is thrown out of action. It results that this arrangement necessitates the provision of a supplementary main clutch between the engine and the transmission device. The toothed wheels and pinions of the gear box are disposed in the same manner as in the embodiments of Figs. 1 and 2. However, in this case, intermediate shaft 3 is driven through an electro-magnetic clutch comprising a disk 31 provided with a return spring 32 and slidably keyed on said shaft 3. An annular induction coil 28 is provided on a plate 17¹ driven by driving shaft 1. Coil 28 is fed by a source of electricity 48, through a circuit 47, a brush 29, and a conducting ring 30.

Between plate 17¹ and hollow shaft 6 there is provided a free wheel 27, which is intended to drive toothed wheel 7, while allowing the latter to revolve with a greater speed than plate 17¹. The operation is the same as in the arrangement of Figs. 1 and 2. If sliding pinion 13 is brought, through the operation of hand lever 25, into mesh with toothed wheel 26 and if coil 28 is not energized, the motion of driving shaft 1 is transmitted in first gear through free wheel 27, hollow shaft 6, and the pairs of wheels 7—8 and 26—13. In order to change into second gear, coil 28 is energized and attracts disk 31, the motion of driving shaft 1 being transmitted in second gear through intermediate shaft 3, and the pairs of toothed wheels 4—8 and 26—13. In order to change from second into third gear, pinion 13 is connected through its dogs to toothed wheel 4, the motion of driving shaft 1 being transmitted in third gear through free wheel 27 and in fourth or top gear through the automatic clutching. It therefore suffices to energize the automatic clutch for producing the passing from first to second gear or the passing from third to fourth gear, and to cut off the current for passing automatically from the second to the first gear or from the fourth to the third gear, owing to the action of the free wheel.

Main circuit breaker 46, provided in circuit 47, can be operated either manually, or, preferably, in an automatic manner, through a diaphragm device 36 analogous to that described with reference to Fig. 1.

When the suction in inlet pipe 33 is low, owing to a slackening of the speed of the engine, circuit 47 is broken at 46 because the diaphragm is driven in a downward direction by its spring 45. The electro-magnetic clutch is not energized and shaft 2 is driven through the free-wheel (first or third speed). If on the contrary the speed of revolution of the engine increases, or if the opening of throttle 34 is reduced, the suction sucks in diaphragm 36 in an upward direction and the contact is made at 46. Coil 28 is energized and the clutch drives shaft 2 in second or in fourth gear, according to the position given by the driver to pinion 13.

In order to avoid too sudden an attraction of clutch disk 31, I may insert in circuit 47 a rheostat 49 working automatically and the lever 51 of which moves along contact studs 50 and is driven by a plunger cooperating with a coil 52, the displacements of said lever being braked by a dash pot 53.

The engine can run in free wheel owing to switches 67 and 66. Circuit breaker 67 is inserted in a shunt circuit 68 connecting the source of electricity 48 to the feed circuit 47 beyond circuit breaker 66. It is controlled at will by the driver and makes it possible to run, optionally and permanently, on free wheel. Switch 66, placed in circuit 47 proper, occupies a position such that it opens automatically when the driver releases throttle pedal 63. When the driver depresses pedal 63, in order to act on rod 64, subjected to the action of its return spring 65 and adapted to control the movements of throttle 34, he first (or simultaneously) obtains the closing of circuit breaker 66, which again closes normal circuit 47.

I have also shown in this Figure 5 the means through which the driver can modify at will the tension of springs 45 that opposes the upward displacements of regulating diaphragm 36. Said means may consist of a cam $70^1$, which acts on the stop of said spring and which is controlled by the driver through operating means or hand lever 72 of the conventional design shown in the drawings. A similar cam 70, controlled by a rod 71 may be provided for the same purpose, in order to modify the tension of spring 45 in accordance with the position of throttle pedal 63.

Figure 6:
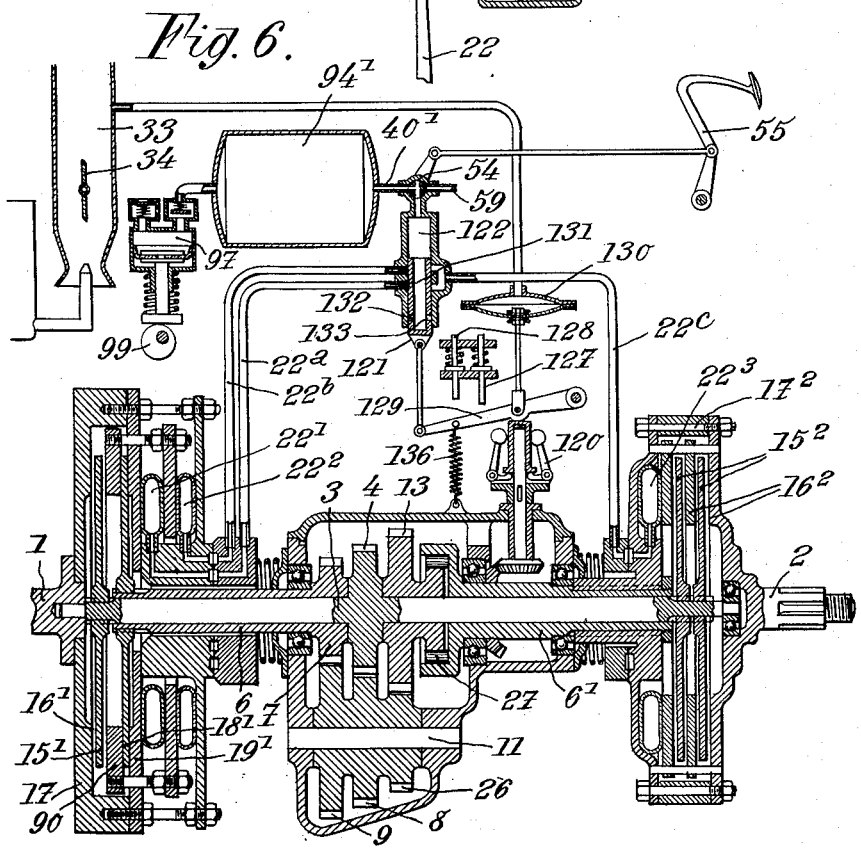
Fig. 6 is a similar view corresponding to a fourth embodiment of my invention.

In Fig. 6 I have shown a four speed gear box comprising three pairs of gear wheels 7—9, 4—8 and 13—26 always in mesh, which makes it possible to obtain a progressive meshing for each of the gear combinations through three friction clutches $18^1$—$19^1$, $15^1$—$16^1$ and $15^2$—$16^2$, or the equivalent, and a free wheel 27. In the example shown I control the displacements of the clutch elements through pneumatic annular elements $22^1$, $22^2$, and $22^3$ into which I can send compressed air supplied by a reservoir $94^1$ fed by means of a pump 97 actuated in any suitable manner, for instance through a cam 99.

Reservoir $94^1$ is connected to pneumatic tubes $22^1$, $22^2$ and $22^3$ through stationary conduits $22^a$, $22^b$ and $22^c$ respectively, which open into annular passages with fluidtight rotary packings being provided in the organs that serve to maintain in position said pneumatic tubes.

In order to drive shaft 2 in first gear, it suffices to place chamber $22^1$ into communication with reservoir $94^1$, which applies clutch $18^1$—$19^1$ through plate 90, the motion being transmitted through hollow shaft 6, the pairs of gear wheels 7—9 and 26—13, free wheel 27, hollow shaft $6^1$ and casing $17^2$, which is integral with said hollow shaft $6^1$ and driven shaft 2.

In order to drive shaft 2 in second gear, plate 90 is moved toward the left hand side of Fig. 6 by inflating pneumatic tube $22^2$. The movement is transmitted through clutch disk $15^1$, slidably keyed on intermediate shaft 3, pairs of gear wheels 4—8 and 26—13, free wheel 27, hollow shaft $6^1$ and casing $17^2$.

In order to drive shaft 2 in third gear, clutch $18^1$—$19^1$ is brought into action by pushing plate 90 toward the right hand side by inflating pneumatic tube $22^1$ and clutch $15^2$—$16^2$ which comprises for instance two disks is caused to operate, which makes intermediate shaft 3 integral with casing $17^2$ and shaft 2. The motion is transmitted through hollow shaft 6, pairs of gear wheels 7—9 and 8—4, intermediate shaft 3, clutch $15^2$—$16^2$, casing $17^2$ and driven shaft 2.

In order to run in fourth gear, clutches $15^1$—$16^1$ and $15^2$—$16^2$ are both engaged by inflating air chambers $22^2$ and $22^3$ and the movement is transmitted with a direct drive, through fly-wheel 17, intermediate shaft 3 and casing $17^2$.

The distribution of compressed air into chambers $22^1$, $22^2$, and $22^3$ can be effected either manually or preferably, as shown in the drawings, in an automatic manner, through the action of a slide valve 121 moving in a chamber 122 and thus establishes the necessary communications between conduit $40^1$, which comes from reservoir $94^1$, and conduits $22^a$, $22^b$, and $22^c$, which lead to said air chambers respectively.

Slide valve 121 is advantageously controlled by a centrifugal governor 120 driven by driven shaft 2. In the example shown in the drawings I have supposed that governor 120 is driven by a casing $17^2$ adapted to move together with driven shaft 2 so that it can follow the variations of the speed of revolution of said shaft. Said governor can occupy four characteristic positions, to wit: (1) that for which it is at the bottom of its stroke and for which slide valve 121 establishes a communication through 131 between reservoir $94^1$ and the conduit $22^a$ that leads to chamber $22^1$ (first gear), the communications with the other conduits $22^b$ and $22^c$ being stopped, so that when the engine is started and although driven shaft 2 is then stopped the vehicle is driven in first gear; (2) that for which operating lever 129 of the slide valve, with its return spring 136, is in contact with an elastic stop 127 and for which the reservoir is connected through 131 with conduit $22^b$ (second gear), conduits $22^a$ and $22^b$ being stopped; (3) that for which lever 129 of the slide valve has overcome the tension of the spring of elastic stop 127 and is applied against a second elastic stop 128 placed behind the first one, connections being established, through 132 and 133, between reservoir $94^1$ and conduits $22^a$ and $22^c$, while conduit $22^b$ is stopped, which corresponds to the third gear; and (4) that for which the lever 129 of the slide valve has overcome the tensions of the springs of both elastic stops 127 and 128 and is at the end of its stroke, connetcions being established, through 132 and 133 between reservoir $94^1$ and conduits $22^b$ and $22^c$, while conduit $22^a$ is stopped, which corresponds to the fourth speed or direct drive.

In order to avoid that a reduced speed gear combination may be brought into action when, due to the closing of throttle 34, the whole power of the engine is not being used, I have provided supplementary controlling means adapted to modify the working conditions of centrifugal governor 120.

To this effect, I cause a diaphragm 130 provided in a chamber connected with inlet pipe 33 of the engine behind throttle 34 to act on lever 129 that controls the displacements of slide valve 121. The effect of said diaphragm is so calculated that when throttle 34 is closed the suction may be sufficient for pulling upwardly lever 129, without any action of governor 120 and against the action of the springs of elastic stops 127 and 128. When the throttle is closed, the gear box therefore maintains the direct drive whatever be the speed of the vehicle at that moment. Running on another gear combination, under the control of governor 120, can only take place when the throttle is partly or wholly open, which reduces or eliminates the action of diaphragm 130 by the diminution of the degree of suction in conduit 33 that results therefrom.

In order to disconnect the driven shaft from the driving shaft, I control, through a pedal 55, a cock 54 provided in conduit 40¹. Said cock, under the action of the pedal, when the latter is depressed, separates reservoir 94¹ from the box 122 in which moves slide valve 121 and places said box in communication with the atmosphere through 59, which produces the simultaneous disengaging of all the clutches provided in the box, both in the case in which said clutches are controlled through pneumatic chambers and when they are controlled through compressed air pistons.

While I have disclosed what I deem to be practical and efficient embodiments of my invention, it should be well understood that I do not wish to be limited thereto as there might be changes made in the arrangement, disposition and form of the parts without departing from the principle of my invention as comprehended within the scope of the appended claims.

What I claim is:

1. In a motor vehicle including a change speed device, the combination of an operating lever for controlling said device, means responsive to variations in the suction of the engine for actuating said lever, means responsive to the same variations for controlling the first mentioned means, a clutch pedal, means operatively connected with said pedal for throwing the first mentioned means out of action when said pedal is depressed, said means being provided with a certain play for allowing the working of the first mentioned means when the pedal is not depressed, and elastic means for bringing said lever into neutral position when said first mentioned means are thrown out of action.

2. In a motor vehicle including a change speed device, an inlet pipe for the engine, and a throttle in said pipe, the combination of a lever for controlling said device, a vacuum reservoir, a diaphragm, elastic means for urging said diaphragm in one direction, a pipe connecting one face of said diaphragm with said inlet pipe after said throttle for urging said diaphragm in the opposite direction, a cylinder, a piston adapted to reciprocate in said cylinder and operatively connected with said lever, a conduit opening into said cylinder, and a slide valve operatively connected with said diaphragm for connecting said conduit either with said reservoir or with the atmosphere.

3. A combination according to claim 2 further comprising a cock inserted in said conduit, a derived circuit connecting said cylinder with a point of said conduit located beyond said cock, a slide valve positively connected with said piston and adapted to control said derived circuit, and a clutch pedal operatively connected with said cock for closing it when the pedal is depressed.

4. In a motor vehicle including a driving shaft and a driven shaft, the combination of a change speed mechanism including a plurality of clutches, pneumatic means for operating said clutches respectively, a reservoir of compressed air, distributing means for connecting said reservoir to said pneumatic means according to predetermined combinations, and a centrifugal governor operatively connected with one of said shafts for controlling said distributing means.

5. In a motor vehicle including a driving shaft, a driven shaft, an inlet pipe for the engine and a throttle in said pipe, the combination of a change speed mechanism including a plurality of clutches, pneumatic means for operating said clutches respectively, a reservoir of compressed air, distributing means for connecting said reservoir with said pneumatic means according to predetermined combinations, a centrifugal governor operatively connected with one of said shafts for controlling said distributing means, and means responsive to variations of depression in said pipe for modifying the action of said centrifugal governor according to the position of the throttle, whereby a direct drive is maintained when the throttle is closed.

6. In a vehicle assembly, a motor including an induction pipe, a driving shaft, a driven shaft, groups of constant mesh gears each combined with progressive clutches operative to combine said shafts in any one of a plurality of speed ratios, a displaceable control member operating to separately actuate said progressive clutches to connect one of said constant mesh gears in driven relation to said driving and driven shafts, pneumatically actuated means connected to said control member, and means responsive to variations in the suction in said induction pipe to control said pneumatically actuated means.

7. In a vehicle assembly, a motor including an induction pipe, a driving shaft, a driven shaft, groups of constant mesh gears each combined with progressive clutches operative to combine said shafts in any one of a plurality of speed ratios, an angularly displaceable control member operative to separately actuate said progressive clutches to connect one of said constant mesh gears in driven relation to said driving and driven shafts, pneumatically actuated means connected to said control member, and means responsive to variations in the suction in said induction pipe to control said pneumatically actuated means.

8. In a vehicle assembly, a motor including an induction pipe, a driving shaft, a driven shaft, groups of constant mesh gears each combined with progressive clutches operative to combine said shafts in any one of a plurality of speed ratios, a longitudinally displaceable control member operative to separately actuate said progressive clutches to connect one of said constant mesh gears in driven relation to said driving and driven shafts, pneumatically actuated means connected to said control member, and means responsive to variations in the suction in said induction pipe to control said pneumatically actuated means.

9. In a motor vehicle including a driving shaft and a driven shaft, the combination of a change speed mechanism including a plurality of clutches, fluid pressure means for operating said clutches respectively, a reservoir containing fluid under pressure distributing means for connecting said reservoir to said fluid pressure means according to predetermined combinations, and a centrifugal governor operatively connected with one of said shafts for controlling said distributing means.

10. In a motor vehicle including a driving shaft, a driven shaft, an inlet pipe for the engine and a throttle in said pipe, the combination of a change speed mechanism including a plurality of clutches, fluid pressure means for operating said clutches respectively, a reservoir containing fluid under pressure, distributing means for connecting said reservoir with said fluid pressure means according to predetermined combinations, a centrifugal governor operatively connected with one of said shafts for controlling said distributing means, and means responsive to variations of suction in said pipe for modifying the action of said centrifugal governor according to the position of the throttle, whereby a direct drive is maintained when the throttle is closed.

11. In a vehicle assembly, a motor including an induction pipe, a driving shaft, a driven shaft, groups of constant mesh gears each combined with progressive clutches operative to combine said shafts in any one of a plurality of speed ratios, a displaceable control member operating to separately actuate said progressive clutches to connect one of said constant mesh gears in driven relation to said driving and driven shafts, fluid pressure actuated means connected to said control member, and means responsive to variations in the suction in said induction pipe to control said fluid pressure actuated means.

12. In a vehicle assembly, a motor including an induction pipe, a driving shaft, a driven shaft, groups of constant mesh gears each combined with progressive clutches operative to combine said shafts in any one of a plurality of speed ratios, an angularly displaceable control member operative to separately actuate said progressive clutches to connect one of said constant mesh gears in driven relation to said driving and driven shafts, fluid pressure actuated means connected to said control member, and means responsive to variations in the suction in said induction pipe to control said fluid pressure actuated means.

13. In a vehicle assembly, a motor including an induction pipe, a driving shaft, a driven shaft, groups of constant mesh gears each combined with progressive clutches operative to combine said shafts in any one of a plurality of speed ratios, a longitudinally displaceable control member operative to separately actuate said progressive clutches to connect one of said constant mesh gears in driven relation to said driving and driven shafts, fluid pressure actuated means connected to said control member, and means responsive to variations in the suction in said induction pipe to control said fluid pressure actuated means.

ALPHONSE FORICHON.